May 22, 1962 R. O. WILEY ET AL 3,036,185
WIRING DEVICE
Filed March 24, 1959 2 Sheets-Sheet 1

WITNESSES
Edwin E. Bassler
Zigmund Skerner

INVENTORS
Roy O. Wiley &
Charles D. Baxendell
BY Donald Smith
ATTORNEY

United States Patent Office 3,036,185
Patented May 22, 1962

3,036,185
WIRING DEVICE
Roy O. Wiley, Bridgeport, Conn., and Charles D. Baxendell, Pitcairn, Pa., assignors to The Bryant Electric Company, Bridgeport, Conn., a corporation of Connecticut
Filed Mar. 24, 1959, Ser. No. 801,660
14 Claims. (Cl. 200—172)

This invention relates generally to electric wiring devices and more particularly to new and improved wall plates and actuators therefor.

This invention is directed not only to wall plates and actuators of an unusual appearance which are especially complementary to modern decor but is also directed to new and improved means for securing the wiring device, wall plate and actuator together and to a suitable support.

The actuator forming a part of this invention is permitted only limited angular movement and thereby is utilized with an electric switch which requires small angular travel of the switch actuator to operate the switch. One example of a switch fulfilling the above requirement is described in detail and claimed in the copending application of Roy O. Wiley, entitled "Wiring Device," Serial No. 801,658, filed concurrently with the present application and assigned to the present assignee (hereinafter at times referred to as the Wiley application). The Wiley application is incorporated by reference into the instant application.

A wall plate which may be utilized with the present invention is preferably formed of a standard size and thickness to comply with those standardized by the underwriter's laboratories. The front surface of the wall plate is provided with a large shallow recess therein of a depth substantially equal to the thickness of the switch actuator and is formed of a size to receive the switch actuator therein. The wall plate forms a rim or border around the periphery of the actuator and as described hereinafter the actuator is generally planar so that when assembled to the wall plate the combined actuator and wall plate provide a substantially planar front surface, eliminating the unattractive switch handle which normally projects from the front surface of the wall plate. An elongated opening is centrally located in the actuator recess of the wall plate and the switch is secured to the rear surface of the wall plate with the switch handle aligned with the opening and exposed to the front surface of the wall plate. The rear surface of the wall plate adjacent the opening is provided with outwardly extending projections conforming to the outer periphery of the switch and the yoke of the switch is provided with resilient arms which frictionally engage portions of the outwardly facing side surface of the projections to hold the switch in the aforesaid position.

There is provided cooperating means on the switch handle and on the planar actuator to secure these parts together. One embodiment of this invention contemplates the use of a pair of spaced openings in the front surface of the switch handle having resilient means located in the switch handle adjacent the openings respectively which frictionally engage a pair of outwardly extending pins or projections formed integrally with the rear surface of the actuator.

The actuator while generally planar is preferably formed at its inner surface by a pair of planes which intersect at the transverse center line of the actuator having a relatively large angle between them. A switch and accompanying actuator have been constructed in accordance with the principles of this invention wherein the angle between the intersecting planes was constructed to be as great as 177 degrees so that rotation of the actuator only through an angle of 3 degrees is permitted. The front surface of the actuator may conform to the rear surface thereof or may be completely flat without affecting the co-operation of the elements forming the present invention.

It is to be noted that the operation of the invention is not affected by the shape of the actuator or recess in the wall plate so that rectangular, square, oval, circular or any other arcuate shape of actuator may be employed. Furthermore, the actuator may be formed from a colored material or a transparent material without affecting the operation of the invention. In order to provide an arrangement wherein the wall plate and actuator comply to the decor of a room in which they are placed, an actuator may be formed from a transparent material with the rear surface thereof painted to comply with the decoration of the room. Furthermore, by utilizing a transparent actuator, a piece of appropriately colored paper may be placed between the rear surface of the actuator and the bottom of the recess in the front surface of the wall plate in order to provide an attractive switch which matches the wallpaper used in a particular room.

It is therefore an object of the present invention to provide a novel wall plate and switch actuator of attractive appearance.

Another object of this invention is to provide a novel switch actuator and a cooperating wall plate for the actuator which allows only limited angular movement of the actuator.

Still another object of this invention is to provide a novel actuator for an electric switch which is relatively large in size and substantially planar.

A more particular object of this invention is to provide a novel wall plate for an electric switch having a relatively large shallow recess therein for locating a similarly shaped planar switch actuator therein.

Another object of this invention is to provide an enlarged switch actuator having novel means thereon for securing the actuator to a switch handle.

Another object of this invention is to provide a novel wall plate for an electric wiring device wherein the yoke of the electric wiring device cooperates to secure the wiring device to the wall plate.

Still another object of this invention is to provide a novel wall plate for an electric wiring device and an actuator mounted therein formed from a transparent material and including means for locating decorative material between the actuator and the wall plate.

These and other objects of this invention will become apparent from the following description of an illustrative embodiment of the invention, taken in conjunction with the accompanying drawings, in which.

Figure 1:
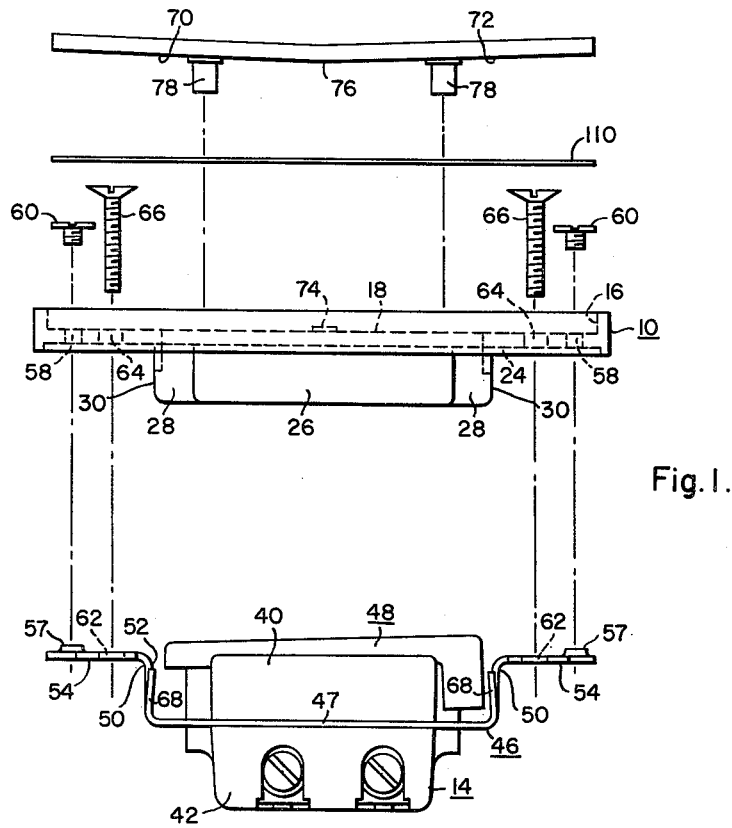
FIGURE 1 is a view in end elevation of the disassembled component parts of a wiring device constructed in accordance with the principles of this invention and illustrating the relative physical location of the parts before assembly.
Figure 2:
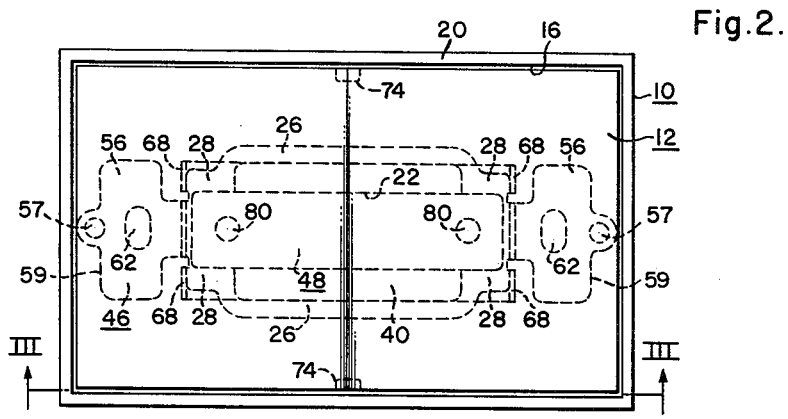
FIG. 2 is a view in front elevation of the wiring device shown in FIG. 1 with the wiring device being assembled and showing certain portions thereof in dotted lines.

Referring specifically to FIGS. 1 through 5, it is to be noted that a wiring device constructed in accordance with the principles of this invention includes a wall plate 10, an enlarged generally planar actuator 12 and a suitable switch mechanism 14. The wall plate 10 and the actuator 12 are preferably formed from insulating material, such as a molded insulating material whereby a unitary member of particular size and shape described hereinafter may be conveniently provided. For a more particular description of the switch 14, reference is made to the aforesaid Wiley application.

The wall plate 10 at its front surface is provided with a relatively large shallow recess 16 which terminates in a flat bottom wall 18. As shown the recess 16 is substantially equal in size to the entire front surface of the wall plate 10 except for the provision of a narrow rim or border 20 which extends around the periphery of the recess 16. The wall plate 10 is shown to be rectangular in shape and is provided with a centrally located elongated opening 22 (shown in dotted line in FIG. 2) which extends therethrough from the inner surface 18 of the recess 16 to the rear surface 24 of the plate 10. The rear surface 24 of the wall plate 10 is provided with a pair of outwardly extending projections 26 located adjacent the longitudinal dimension of the opening 22. The end portions 28 of the projections 26 are offset inwardly toward the opening 22 adjacent the ends of the opening 22. Thus the inner side surface of the end portions 28 are in alignment with the side edge of the opening 22 adjacent thereto and the corresponding surfaces of the projections 26 are spaced from the adjacent side edges of the opening 22. Accordingly, a portion of the bottom wall 24 of the plate 10 is located between the projection 26 and the edge of the opening 22. The projections 28 terminate in side surfaces 30 which face the adjacent ends of the wall plate 10, respectively. The rear wall 24 of the bottom plate 10 is formed with a raised portion 32 which extends about the entire periphery of the rear wall 24 and includes raised ribs 34 which extend laterally across the rear wall 24. The raised portion 32, centrally of the ends of the plate 10 is provided with integral extensions 36 which extend inwardly of the rear wall 24 from the end edges of the wall plate 10 and which terminate with arcuate side walls 38 at the inward extents thereof, respectively.

The switch 14 is preferably formed by upper and lower housings 40 and 42 which are clamped together by means of screws 44 (FIG. 4) with a generally U-shaped yoke 46 clamped therebetween. The switch 14 additionally includes an elongated handle 48 which extends outwardly from the upper surface of the upper housing 40 and which pivotally moves about the lateral center line of the switch 14 to operate the circuit opening and closing means (not shown) of the switch 14. The handle 48 is narrower in width than the upper and lower housings 40 and 42 and its longitudinal dimension is greater than the corresponding dimension of the upper housing 40 so that portions of the handle 48 extend outwardly beyond the opposite ends of the upper housing 40. The front or top surface of the handle 48 is adapted to be rather closely received within the opening 22 in the wall plate 10 but is pivotally movable relative to the switch 14 when located in the opening 22. The outer periphery of the upper housing 40 and switch handle 48 conform in shape to the area defined by the projections 26 and 28 of the wall plate 10 and are adapted to be located therebetween with the handle 48 located in the opening 22. The front or upper surface of the upper housing 40 engages the portion of the rear wall 24 located between the projections 26 and the opening 22.

Figure 3:
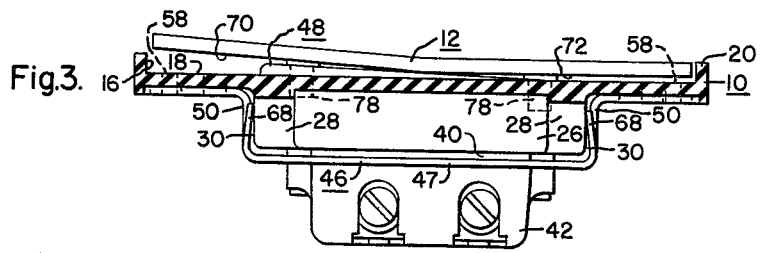
FIG. 3 is a sectional view of the wiring device shown in FIGS. 1 and 2 taken substantially along the reference line III—III of FIG. 2.

As seen in FIG. 3, the yoke 46 of the switch 14 cooperates to fixedly locate the switch 14 relative to the wall plate 10. The bight 47 of the yoke 46 is clamped between the upper and lower switch housings 40 and 42 with the arms 50 of the yoke 46 extending upwardly toward the handle 48, but spaced from the ends of the handle 48. The arms 50 of the yoke 46 include a centrally located securing portion 52 which terminates at its upward end in a laterally extending mounting structure 54. Each mounting structure 54 is provided with an enlarged portion 56 adjacent the outward end thereof with the outward end of the enlarged portion 56 terminating in an arcuate edge 59 which is shaped complementarily to the arcuate edge 38 of the plate extension 36. Each mounting structure 54 is provided adjacent its outward end with a threaded opening 57 which is alignable with an opening 58 in the wall plate 10 located adjacent each end thereof when the switch 18 is mounted on the wall plate 10. The yoke 46 is adapted to be secured to the wall plate 10 by means of machine screws 60 (FIG. 1) which are passed from the front surface of the wall plate 10 through the openings 58 and which threadedly engage the threaded opening 57 of the yoke 46, respectively. The enlarged portion 56 is additionally provided with elongated openings 62 which are aligned with similarly shaped openings 64 in the wall plate 10 when the switch 14 is assembled to the wall plate 10. Machine screws 66 are adapted to be inserted from the front surface of the wall plate 10 through the aligned openings 64 and 62, respectively, in order to secure the wall plate 10 and the switch 14 to a suitable support (not shown) such as a metallic wall box.

Figure 4:
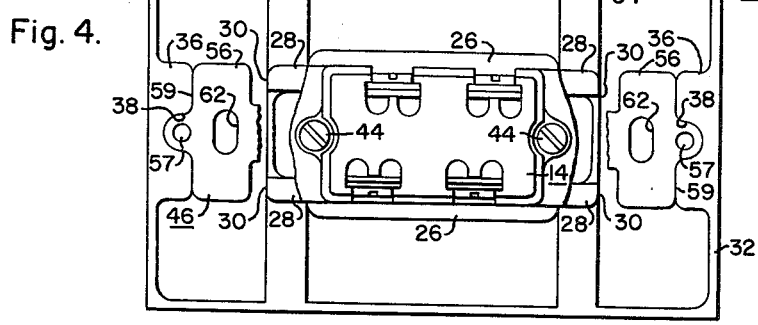
FIG. 4 is a view in rear elevation of the wiring device shown in FIGS. 1 and 2 having portions of the yoke cut away for clarity.

Each arm 50 of the yoke 46 is additionally provided with a pair of upwardly extending resilient projections 68 located on opposite sides of the support portions 52. As shown in FIG. 4, when the switch 14 is assembled to the wall plate 10, the resilient projections 68 of the yoke 48 are adapted to be located outwardly of the end surface 30 of the wall plate projections 28 and are adapted to frictionally engage the surfaces 30 respectively.

The frictional engagement of the projections 68 with the surface 30 results in a structure wherein substantial force is required to separate the switch 14 from the wall plate 10. Accordingly, use of the screws 60 for securing the switch 14 to the wall plate 10 is rendered as merely an optional method for securing these parts together.

The actuator 12 has the appearance of being substantially flat and is of a size to be closely received within the recess 16 of the wall plate 10 but being pivotally movable therewithin. While the actuator 12 is of generally flat appearance, it is to be noted that the actuator 12 is actually divided along its lateral center line into a pair of flat converging planes 70 and 72 which are joined at the lateral center line of the actuator. The angle between the planes 70 and 72 may be made as large as 177 degrees, that is, if the plane 70 were extended beyond its inward edge, the angle between the extension of the plane 70 and the plane 72 would be 3 degrees or more. The actuator described in this embodiment of the invention includes both the front surface and the rear surface of the planes 70 and 72 to extend at the aforesaid angles; however, in accordance with this invention, it is only necessary for the rear surface of the actuator 12 to be formed by converging planes. Thus, the front surface of the actuator 12 may be constructed to be planar without effecting the operation of the invention.

The inner surface 18 of the recess 16 is provided with a pair of spaced raised portions or paths 74 along the lateral center line of the wall plate 10 and located adjacent the rim 20 thereof. The lateral center line 76 which comprises the line of joinder of the planes 70 and 72 is adapted to be located in part on the paths 74 with the planes 70 and 72 being pivotally movable thereabout. When the plane 72 is pivotally moved inwardly of the recess 16 (as shown in FIG. 3) it is to be noted that the front surface of the plane 72 is substantially in alignment with the front surface of the rim 20 of the wall plate 10 and the plane 70 extends slightly outwardly from the front surface of the rim 20 at a particular angle defined by the angle of convergence of the planes 70 and 72. Similarly when the plane 70 is moved inwardly of the recess 16, the plane 70 is in alignment with the front surface of the rim 20 and the plane 72 extends slightly outwardly from the front surface of the rim 20 at the same angle. The back or rear surface of the actuator 12 is provided with a pair of spaced projections 78 formed integrally thereon and extending outwardly therefrom. One of the projections 78 is located in the plane 70 and the other projection 78 is located in the plane 72. The projections 78 are adapted to be located in spaced openings 80 located in the front surface of the actuator 48. Gripping means such as U-shaped springs 82, as described hereinafter, are formed on the under surface of the switch handle 48 to frictionally engage the projections 78. The gripping means firmly engage the projections 78 and prevent relative pivotal movement of the actuator 12 and the handle 48. Thus, upon pivotal movement of the actuator 12 about its lateral center line 76, the handle 48 also is pivotally moved to operate the switch mechanism.

Figure 5:
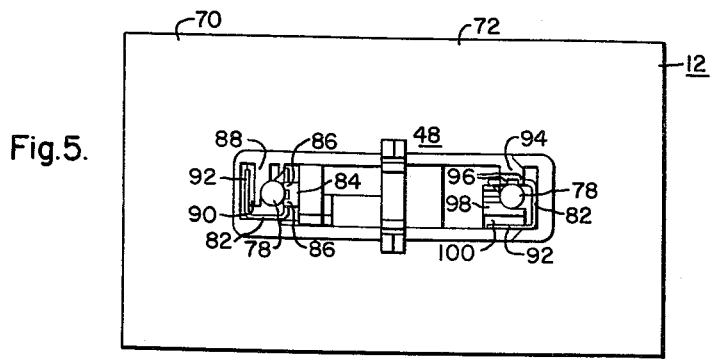
FIG. 5 is a view in rear elevation of the actuator and switch handle illustrating the structure for securing these parts together.

FIG. 5 is illustrative of the rear surface of the actuator 12 and of the under surface of the handle 48 and illustrates one form of gripping means for the actuator projections 78. The gripping means for the actuator projections 78 include in part the U-shaped springs 82 which engage the under surface of switch handle 48 adjacent the openings 80, respectively. The under surface of the switch handle 48 adjacent the left-hand side of the actuator (FIG. 5) is provided with an outwardly extending projection 84 which, adjacent its outward extent, includes a pair of spaced laterally extending portions 86. The portions 86 are spaced from the under surface of the switch handle 48 a distance equal to the thickness of the spring 82 and one arm of the spring 82 is adapted to be located between the under surface of the switch handle 48 and the laterally extending portions 86. The last-mentioned arm of the spring 82 additionally overlies a portion of the handle opening 80 so that the actuator projections 78, when located in the opening 80, resiliently moves the portion of the spring 82 overlying the opening. The under surface of the switch handle 48 is additionally provided with a raised portion 88 located in opposed relation to the projections 86. The outward extent of the raised portion 88 is joined at its outward side edge to the under surface of the handle 48 by an outwardly sloping surface 90 and the other arm 92 of the spring 82 is adapted to engage the inclined surface 90 adjacent its line of joinder with the under surface of the handle 48. The location of the arm 92 relative to the handle 48 also defines the location of the projection engaging arm of the spring 82 relative to the handle opening 80. Thus, when the actuator projection 78 biases the adjacent arm of the spring 82, the latter arm exerts a gripping force on the projection 78. Similarly, adjacent the right-hand handle opening 80 (FIG. 5) there is provided a projection 94 having laterally extending portions 96 which cooperate in the same manner as the projection 84 and the portions 86 to hold the spring 82 in position. A raised portion 98 having an inclined surface 100 cooperates in the same manner as the raised portion and inclined surface 90 to hold the arm 92 of the spring 82 in position. Thus, the right-hand actuator projection 78 is also frictionally gripped by one arm of the spring 82.

It has been pointed out hereinbefore wherein a novel switch actuator and wall plate cooperate to provide an improved and attractive wall switch. For purposes of decor it is to be noted that the front surface of the actuator may be formed of a colored material or may be transparent. When a transparent actuator is utilized a piece of colored paper or wallpaper 110 (FIG. 1) may be provided with a pair of spaced openings (not shown) therein to allow the projections 78 to pass therethrough. The wallpaper 110 is preferably located between the rear surface of the actuator 12 and the bottom surface 18 of the recess 16 in the wall plate 10.

It is to be noted that any shape or size actuator can be utilized in the present invention inasmuch as the mode of operation of the actuator is independent of the outer appearance thereof. Furthermore, it is to be noted that there has been shown herein a novel switch and wall plate wherein the yoke of the switch cooperates with the wall plate to fixedly secure the switch to the wall plate.

Another feature of the invention is in the use of the openings 64 in the wall plate 10 for purposes of securing the switch 14 and the wall plate 10 to a suitable support or box. With this construction, the switch 14 may first be secured to the wall plate 10 and the assembled switch and wall plate may then be secured to the support by means of screws 66. This procedure is particularly advantageous when the wall plate 10 is utilized with a plurality of switches in a "gang" arrangement. With structures of the prior art it has been first necessary to secure the gang of switches to the wall box before mounting the wall plate thereon. As a result it has been extremely time consuming inasmuch as the switches, after being secured to the box, must then be aligned with the openings in the wall plates for purposes of locating the switch handle. The improved assembly structure as defined by this invention does not impair the attractiveness of the wall plate inasmuch as all screws 60 and 66 are not exposed to the front surface of the wall plate 10 but rather are hidden therefrom by the actuator 12.

From the above description it can be seen that the invention is susceptible to various changes and modifications without departing from its broad spirit and scope. Accordingly, it is specifically intended that this description be interpreted as illustrative rather than in a limiting sense.

We claim as our invention:

1. In combination, an electric wiring device and a wall plate, said wiring device being located on the rear surface of said wall plate with a pivotable handle thereof exposed to the front surface of said wall plate through an aperture in said wall plate, aligned securing openings in said wall plate and said wiring device extending from the front surface of said wall plate therethrough and through said wiring device, securing means located in said securing openings for securing said wiring device and said wall plate together, and an enlarged actuator extending along said front surface of said wall plate and of a size to cover said securing openings and said securing means so that the latter are not exposed to the front of said wall plate, and means for securing said actuator to said handle so that the latter pivots substantially conformally with pivotal movement of the former.

2. In combination, a wall plate and an electric switch, said switch being mounted on the rear surface of said wall plate and having an elongated handle exposed to the front surface of said wall plate through an aperture in said wall plate, said handle being pivotally movable in said aperture to operate circuit opening and closing means in said switch, an enlarged actuator located on the front surface of said wall plate and pivotally movable relative thereto, cooperating gripping means formed on said handle and on the surface of said actuator facing said front surface of said wall plate to secure said actuator to said handle so that pivotal movement of said actuator creates corresponding pivotal movement of said handle to operate the aforesaid circuit opening and closing means.

3. In combination, a wiring device and a mounting plate, said mounting plate having an enlarged shallow recess in the front surface thereof with said recess having a substantially planar bottom surface, said bottom surface having an enlarged aperture therethrough, said wiring device being fixedly mounted with respect to the rear surface of said plate and having a handle located in said aperture and pivotally movable therein to operate switching means located in said wiring device, an enlarged actuator generally conforming in shape to said recess and located therein, the surface of said actuator facing said recess bottom surface including a pair of converging surfaces with said actuator being pivotally movable within said recess about the line of joinder of said converging surfaces, means for securing said actuator to said handle so that pivotal movement of said actuator causes corresponding pivotal movement of said handle to operate said switching means.

4. In combination, a wiring device and a mounting plate, said mounting plate having an enlarged shallow recess of symmetrical shape in the front surface thereof with said front surface forming a symmetrical rim about the periphery of said recess and with said recess having a substantially planar bottom surface, said bottom surface having an enlarged aperture therethrough, said wiring device being fixedly mounted with respect to the rear surface of said plate and having a handle located in said aperture and pivotally movable therein to operate switching means located in said wiring device, an enlarged actuator generally conforming in shape to said recess and located therein to be bounded closely by said rim, the surface of said actuator facing said recess bottom surface including a pair of converging surfaces with said actuator being pivotally movable within said recess about the line of joinder of said converging surfaces, means for securing said actuator to said handle so that pivotal movement of said actuator causes corresponding pivotal movement of said handle to operate said switching means.

5. In combination, a wiring device and a mounting plate, said mounting plate having an enlarged shallow recess in the front surface thereof with said recess having a substantially planar bottom surface, said bottom surface having an enlarged aperture therethrough, said wiring device being fixedly mounted with respect to the rear surface of said plate and having a handle located in said aperture and pivotally movable therein to operate switching means located in said wiring device, an enlarged actuator of transparent material conforming in shape to said recess and located therein, the surface of said actuator facing said bottom surface including a pair of converging surfaces with said actuator being pivotally movable within said recess about the line of joinder of said converging surfaces, means for securing said actuator to said handle so that pivotal movement of said actuator causes correspondingly pivotal movement of said handle to operate said switching means and means for retaining decorative material between said bottom surface of said recess and said actuator.

6. In combination, a wiring device and a mounting plate, said mounting plate having a substantially planar front surface with the latter surface having an aperture therethrough, said wiring device being fixedly mounted with respect to the rear surface of said plate and having a pivotable handle accessible through said aperture, and an actuator located frontally of said mounting plate and being pivotally movable between at least two positions to operate switching means located in said wiring device, a surface on said actuator being formed by a pair of converging and intersecting planes with said actuator being pivotally movable about a line parallel to the line of joinder of said intersecting planes, one of the positions of said actuator being defined when one of said converging planes is substantially coplanar with the plane of the front surface of said mounting plate, the other of said converging planes diverging outwardly from the plane of said front surface of said mounting plate when said actuator is in said one position, the other position being defined when the other of said converging planes is substantially coplanar with the plane of the front surface of said mounting plate, said one converging plane diverging outwardly from the plane of said front surface when said actuator is in said other position, and means for securing said actuator to said handle so that the latter pivots substantially conformally with pivotal movement of the former.

7. In combination, a wall plate and a wiring device, means for securing said wiring device relative to one surface of said plate, said means including spaced, outwardly extending projections formed on said one surface of said plate, said wiring device including an elongated housing located to extend at least between said projections, and said wiring device having an elongated yoke of resilient material, said yoke extending longitudinally beyond each end of said wiring device and having resilient portions extending inwardly toward said one plate surface and engaging the sides of said plate projections to hold together said wiring device and said plate.

8. In a wiring device, means for securing an actuator member to an elongated handle member, said means comprising at least one projection on one of said members located in a complementarily shaped opening in the other of said members, resilient means mounted on said other member and overlying a portion of said opening, said resilient means being stressed when said projection is located in said opening to frictionally and firmly engage said projection.

9. In a wiring device, means for securing an actuator member to an elongated handle member, said means comprising at least one projection on one of said members located in a complementarily shaped opening in the other of said members, a U-shaped spring having at least one arm thereof fixedly mounted on said other member and having its other arm overlying a portion of said opening, said other arm being stressed relative to said one arm when said projection is located in said opening to fixedly and firmly engage said projection.

10. In combination a wall plate and an electric wiring device, said wall plate including an opening therethrough and having an outwardly extending elongated projection located on one side thereof adjacent said opening, said projection being shaped to define a space conforming substantially to the shape of the outer periphery of said wiring device, said wiring device being closely received in said space with a portion thereof in alignment with said opening, said wiring device including a generally U-shaped yoke secured thereto with the bight portion of said yoke located in part in alignment with said space but spaced outwardly from the outer edge of said projection, said yoke having resilient arms thereon extending inwardly toward said one side of said wall plate and frictionally engaging portions of said projection to secure said wall plate and said wiring device together.

11. In combination, a wiring device and a face plate for the same, means for engaging together said wiring device and said face plate so that a pivotable operating member of said wiring device faces outwardly through said face plate, a generally planar actuator being formed to be positioned adjacently of said face plate, means for engaging said actuator with said wiring device operating member so as to enable the latter to respond with pivotal movement to pivotal movement of the former, and means for supporting said actuator so as to enable it to pivot relative to said face plate and thereby actuate said wiring device operating member, and means for limiting the pivotal movement of said actuator to a nominal amount.

12. In combination, a switch having an elongated pivotable operating member, an elongated pivotable actuator, and means for supporting said actuator relative to said switch operating member so as to enable the latter to respond with pivotal movement to pivotal movement of the former, and means for limiting the pivotal movement of said actuator to a nominal amount, said limiting means including longitudinally converging surfaces of said actuator which face said operating member and which respectively function as stops in providing the limits of actuator movement.

13. In combination, a switch having an elongated pivotable operating member, an elongated pivotable actuator, and gripping means for supporting said actuator relative to said switch operating member so as to enable the latter to follow substantially conformally pivotal movement of the former, and means for limiting the pivotal movement of said actuator to a nominal amount.

14. In combination, a switch having an elongated pivotable operating member, an elongated pivotable actuator, and means for supporting said actuator relative to said switch operating member so as to enable the latter to respond with pivotal movement to pivotal movement of the former, and means for limiting the pivotal movement of said actuator through an angle not greater than substantially four degrees, said limiting means including longitudinally converging surfaces of said actuator which face said operating member and which respectively function as stops in providing the limits of actuator movement.

References Cited in the file of this patent

UNITED STATES PATENTS

| | | |
|---|---|---|
| 1,540,330 | Hartmann | June 2, 1925 |
| 2,011,311 | Gaynor | Aug. 13, 1935 |
| 2,515,932 | Stang et al. | July 18, 1950 |
| 2,546,086 | Brockway | Mar. 20, 1951 |
| 2,587,399 | Smith | Feb. 26, 1952 |
| 2,752,464 | Seeger | June 26, 1956 |